United States Patent
Shuler et al.

(10) Patent No.: US 7,163,242 B2
(45) Date of Patent: Jan. 16, 2007

(54) BUMPER SYSTEM WITH ENERGY ABSORBER

(75) Inventors: Stephen F. Shuler, Royal Oak, MI (US); Gopi Krishna Surisetty, Bangalore (IN); Alok Nanda, Bangalore (IN)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 11/029,435

(22) Filed: Jan. 5, 2005

(65) Prior Publication Data

US 2006/0145491 A1 Jul. 6, 2006

(51) Int. Cl.
*B60R 19/18* (2006.01)

(52) U.S. Cl. .................... 293/120; 293/121
(58) Field of Classification Search ............ 293/102, 293/120, 121, 122, 133
See application file for complete search history.

(56) References Cited

U.S. PATENT DOCUMENTS

| | | | |
|---|---|---|---|
| 5,984,389 A | 11/1999 | Nuber et al. | |
| 6,082,792 A | 7/2000 | Evans et al. | |
| 6,406,081 B1 | 6/2002 | Mahfet et al. | |
| 6,663,150 B1 | 12/2003 | Evans | |
| 6,726,262 B1 | 4/2004 | Marijnissen et al. | |
| 6,746,061 B1 * | 6/2004 | Evans | 293/120 |
| 6,877,785 B1 * | 4/2005 | Evans et al. | 293/120 |
| 6,994,384 B1 * | 2/2006 | Shuler et al. | 293/120 |
| 2001/0026073 A1 | 10/2001 | Sata et al. | |
| 2003/0080573 A1 | 5/2003 | Marijnissen et al. | |
| 2004/0021329 A1 * | 2/2004 | Evans | 293/120 |
| 2004/0094975 A1 | 5/2004 | Shuler et al. | |
| 2004/0256868 A1 * | 12/2004 | Yoon | 293/120 |
| 2006/0055187 A1 * | 3/2006 | Jaarda et al. | 293/133 |

FOREIGN PATENT DOCUMENTS

| | | |
|---|---|---|
| EP | 1193135 | 4/2002 |
| WO | WO 03/022638 | 3/2003 |

* cited by examiner

*Primary Examiner*—Jason Morrow
(74) *Attorney, Agent, or Firm*—Armstrong Teasdale LLP

(57) ABSTRACT

A bumper system for an automobile vehicle includes, in an exemplary embodiment, a beam configured to attach to the vehicle, and an energy absorber coupled to the beam. The energy absorber includes a body, an upper crushable member extending from the body, and a lower crushable member extending from the body and spaced apart from the upper crushable member. The upper and lower crushable members each include an upper transverse wall, a lower transverse wall, and an outer wall. Each upper transverse wall and each lower transverse wall includes alternating solid portions and open portions. Each solid and open portion extends from the body to the outer wall of a crushable member. The solid portions of the lower transverse wall of the upper crushable member are aligned with the open portions of the upper transverse wall of the lower crushable member.

20 Claims, 4 Drawing Sheets

BUMPER SYSTEM WITH ENERGY ABSORBER

BACKGROUND OF THE INVENTION

This invention relates generally to automobile vehicle bumpers, and more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a W-shaped energy absorber. However, the stack-up of the horizontal walls of the energy absorber is a problem. Because of the stack-up issue, known W-shaped energy absorbers cannot be used in pedestrian impact solutions.

BRIEF DESCRIPTION OF THE INVENTION

In one aspect, a bumper system for an automobile vehicle is provided. The bumper system includes a beam configured to attach to the vehicle, and an energy absorber coupled to the beam. The energy absorber includes a body having a first side and an opposing second side with the second side facing the beam, an upper crushable member extending from the first side of the body, and a lower crushable member extending from the first side of the body and spaced apart from the upper crushable member. The upper and lower crushable members each include an upper transverse wall, a lower transverse wall, and an outer wall. Each upper transverse wall and each lower transverse wall includes alternating solid portions and open portions. Each solid and open portion extends from the body to the outer wall of a crushable member. The solid portions of the lower transverse wall of the upper crushable member are aligned with the open portions of the upper transverse wall of the lower crushable member. Also, solid portions of the upper transverse wall of the lower crushable member are aligned with the open portions of the lower transverse wall of the upper crushable member.

In another aspect, a bumper assembly for an automobile vehicle is provided. The bumper assembly includes a beam having a top surface and a bottom surface, with the beam configured to attach to the vehicle, an energy absorber coupled to the beam, and a fascia attached to the energy absorber to substantially envelop the beam and the energy absorber. The energy absorber includes a body having a first side and an opposing second side with the second side facing the beam, an upper crushable member extending from the first side of the body, and a lower crushable member extending from the first side of the body and spaced apart from the upper crushable member. The upper and lower crushable members each include an upper transverse wall, a lower transverse wall, and an outer wall. Each upper transverse wall and each lower transverse wall includes alternating solid portions and open portions. Each solid and open portion extends from the body to the outer wall of a crushable member. The solid portions of the lower transverse wall of the upper crushable member are aligned with the open portions of the upper transverse wall of the lower crushable member. Also, solid portions of the upper transverse wall of the lower crushable member are aligned with the open portions of the lower transverse wall of the upper crushable member.

In another aspect, an energy absorber for a vehicle bumper system is provided. The energy absorber includes a body having a first side and an opposing second side, an upper crushable member extending from the first side of the body, and a lower crushable member extending from the first side of the body and spaced apart from the upper crushable member. The upper and lower crushable members each include an upper transverse wall, a lower transverse wall, and an outer wall. Each upper transverse wall and each lower transverse wall includes alternating solid portions and open portions. Each solid and open portion extends from the body to the outer wall of a crushable member. The solid portions of the lower transverse wall of the upper crushable member are aligned with the open portions of the upper transverse wall of the lower crushable member. Also, solid portions of the upper transverse wall of the lower crushable member are aligned with the open portions of the lower transverse wall of the upper crushable member.

DETAILED DESCRIPTION OF THE INVENTION

A bumper system that includes an energy absorber that is designed to provide improved inner horizontal wall crushing that will eliminate the stack-up of the walls is described below in detail. In an exemplary embodiment, an energy absorber having inner horizontal walls that include alternating solid and open portions is attached to a beam. The solid and open portions are arranged so that during an impact event, the solid portions crush into the open portions so that the solid portions do not hit each other which prevents a stack-up of material. The beams are fabricated, for example, from steel, aluminum, or glass mat thermoplastic (GMT). The energy absorber, in the exemplary embodiment, is fabricated from Xenoy® material and is tunable so as to meet desired impact criteria, e.g., pedestrian and low speed impacts.

Although the bumper system is described below with reference to specific materials (e.g. Xenoy® material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized. Generally, the energy absorber is fabricated from materials that result in efficient energy absorption, and the beam materials and fabrication technique are selected to result in a stiff beam.

Figure 1:
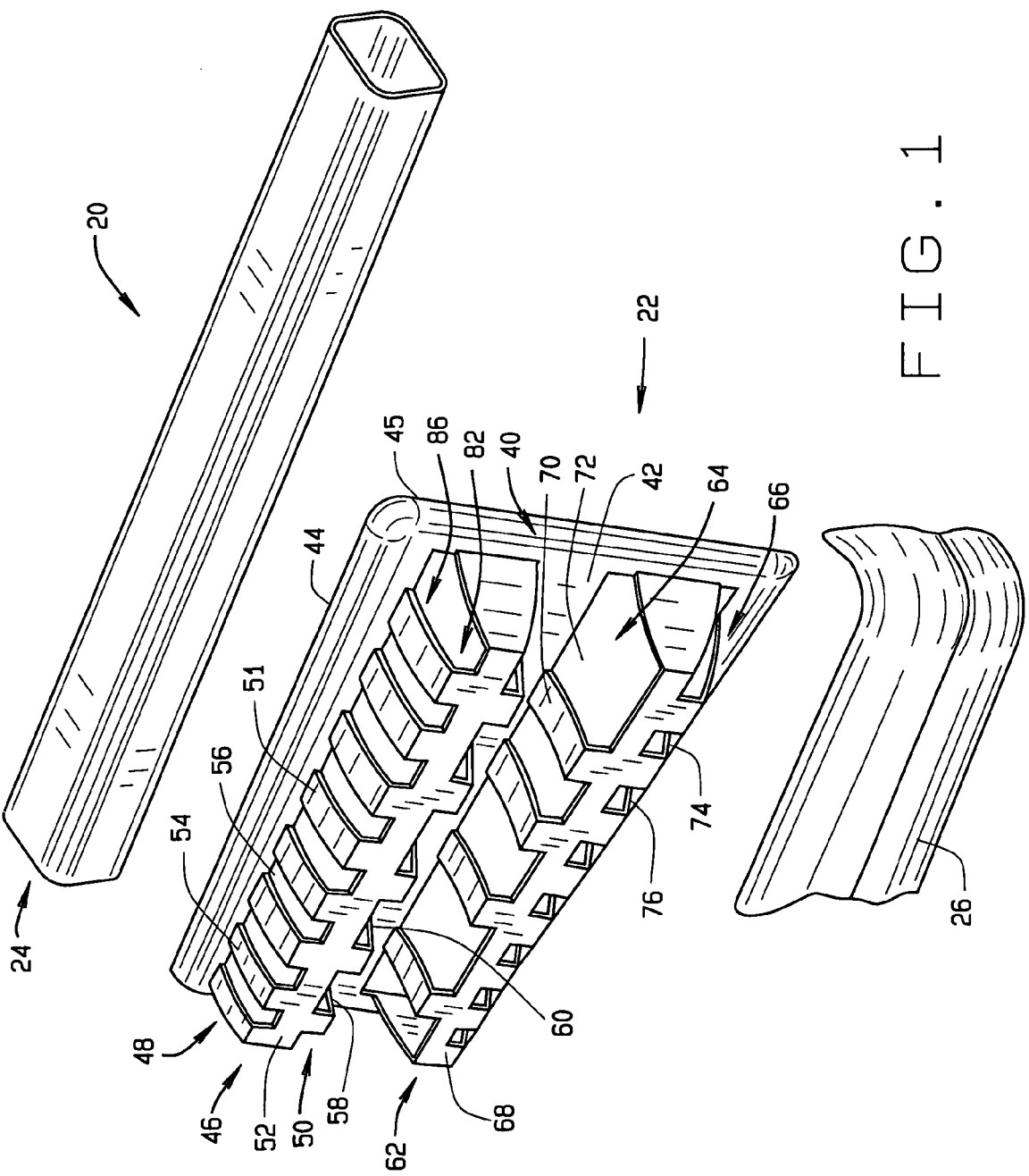
FIG. 1 is an exploded perspective schematic illustration of a bumper assembly in accordance with an embodiment of the present invention.
Figure 2:
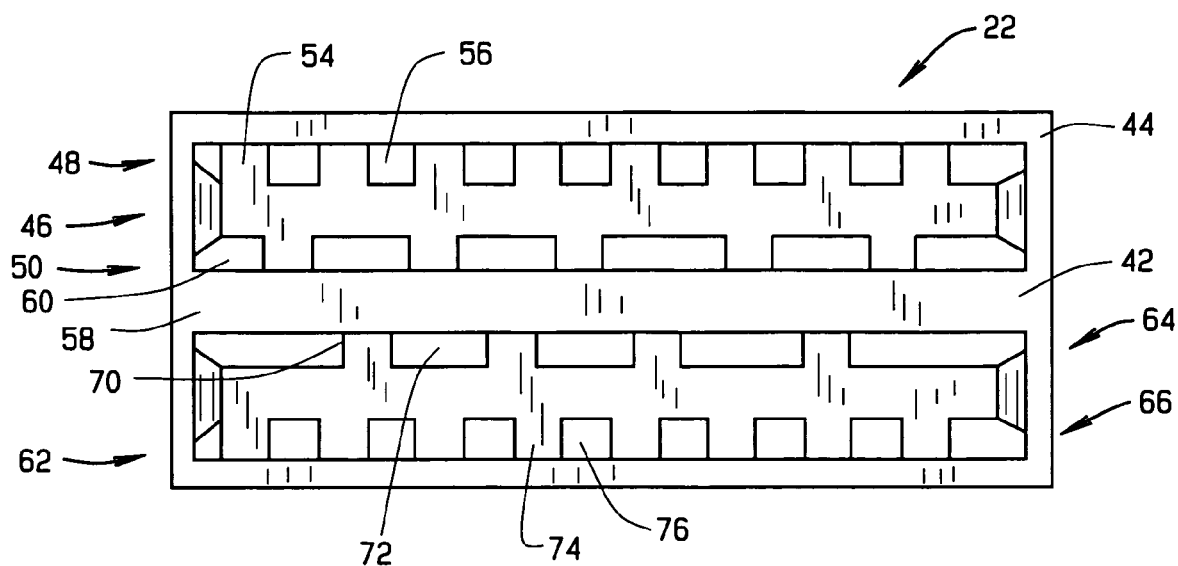
FIG. 2 is a front schematic illustration of the energy absorber shown in FIG. 1.

Referring to the drawings, FIG. 1 is an exploded perspective illustration of a bumper assembly 20 in accordance with an exemplary embodiment of the present invention, and FIG. 2 is a front schematic illustration of energy absorber 22. Referring to FIGS. 1 and 2, bumper assembly 20 includes an energy absorber 22 and a beam 24. Energy absorber 22 is positioned between beam 24 and a fascia 26 which, when assembled, form vehicle bumper assembly 20. As should be understood by those skilled in the art, beam 24 is attached to lengthwise extending vehicle frame rails (not shown).

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the exemplary embodiment, is fabricated from extruded aluminum. In other embodiments, beam 24 is fabricated from roll formed steel or a compression molded glass mat thermoplastic (GMT). Beam 24 can have one of multiple geometries, including being configured as a rectangular section, a B-section, a D-section, an I-beam, or having a C or W cross-sectional shape. The geometry of beam 24 is selected to provide a desired section modulus depending on the particular application in which the beam is to be used.

Energy absorber 22 includes a body 40 having a first side 42 and a second side 44. First side 42 faces away from beam 24 and second side 44 faces toward beam 24. Body 40 includes a flanged frame 45 for attaching energy absorber 22 to beam 24. An upper crushable member 46 extends from first side 42 of body 40. Upper crushable member 46 includes an upper transverse wall 48, a lower transverse wall 50, and an outer wall 52. Upper transverse wall 48 includes alternating solid portions 54 and open portions 56 along the length of upper crushable member 46. Solid portions 54 and open portions 56 extend from body 40 to outer wall 52. Similarly, lower transverse wall 50 includes alternating solid portions 58 and open portions 60 along the length of upper crushable member 46. Solid portions 58 and open portions 60 extend from body 40 to outer wall 52.

A lower crushable member 62 also extends from first side 42 of body 40 and is spaced apart from upper crushable member 46. Lower crushable member 46 has a structure similar to upper crushable member 46 and includes an upper transverse wall 64, a lower transverse wall 66, and an outer wall 68. Upper transverse wall 64 includes alternating solid portions 70 and open portions 72 along the length of lower crushable member 62. Solid portions 70 and open portions 72 extend from body 40 to outer wall 68. Similarly, lower transverse wall 66 includes alternating solid portions 74 and open portions 76 along the length of lower crushable member 62. Solid portions 74 and open portions 76 extend from body 40 to outer wall 68.

Figure 3:
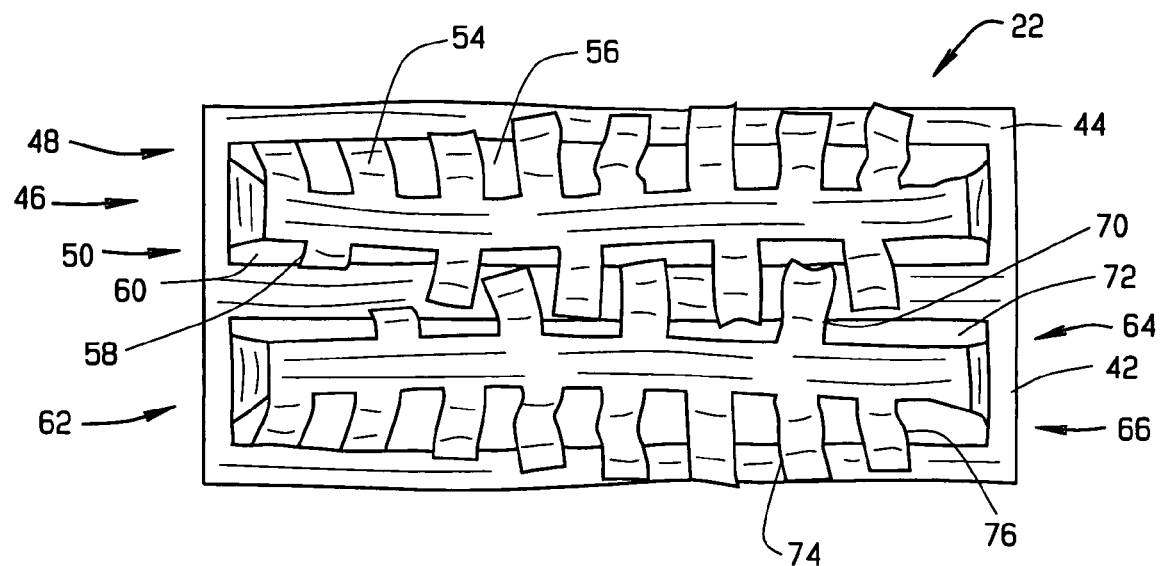
FIG. 3 is a front schematic illustration of the energy absorber shown in FIG. 1 after an impact event.

Solid portions 58 of lower transverse wall 50 of upper crushable member 46 are aligned with open portions 72 of upper transverse wall 64 of lower crushable member 62. Also, solid portions 70 of upper transverse wall 64 of lower crushable member 62 are aligned with open portions 60 of lower transverse wall 50 of upper crushable member 46. As illustrated in FIG. 3, this arrangement permits solid portions 58 of lower transverse wall 50 of upper crushable member to buckle into open portions 72 of upper transverse wall 64 of lower crushable member 62 and solid portions 70 of upper transverse wall 64 of lower crushable member 62 to buckle into open portions 60 of lower transverse wall 50 of upper crushable member 46 during an impact event. With the solid portions of the transverse walls bucking into the open portions of the opposing transverse wall, stack-up of the opposing transverse walls 50 and 64 is eliminated. A stack-up of the opposing transverse walls 50 and 64 could adversely affect the ability of energy absorber 22 to absorb energy.

In the example embodiment, transverse walls 48, 50, 64 and 66 vary linearly in thickness from a first front-most portion 82 to a rearmost portion 86. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 82 to rearmost portion 86 and is between about 1 mm to about 7 mm. In still further embodiments, the thickness of the walls are stepped. Particularly, the thickness of the walls of front-most portion 82 is constant and the thickness of the walls of rearmost portion 86 is constant with the walls of rearmost portion 86 thicker than the walls of front-most portion 82.

Energy absorber 22 is tunable in that by selecting a thickness of each portion 82 and 86, the response of energy absorber 22 can be altered depending on the application in which absorber 22 is used. For example, front portion 82 of energy absorber 22 is tuned, and tunable, to absorb pedestrian leg form impact, and rear portion 86 is tuned, and tunable, for low speed and pendulum impact.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to form energy absorber 22 include high toughness/ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (l/hdpe), polypropylene (pp) and thermoplastic olefins (tpo).

Figure 4:
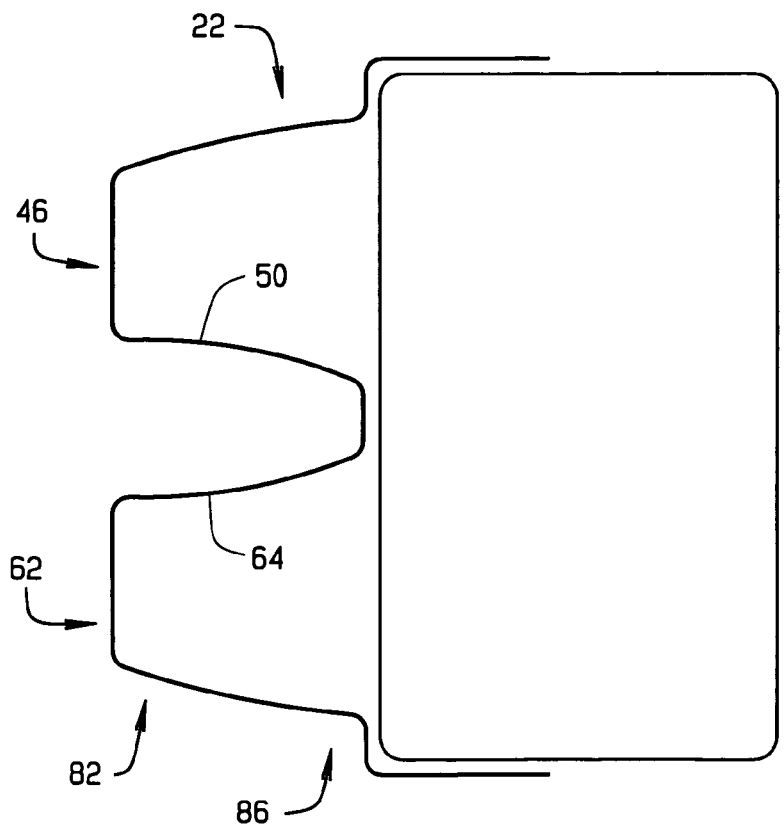
FIG. 4 is a cross-sectional schematic illustration of the energy absorber shown in FIG. 1.
Figure 5:
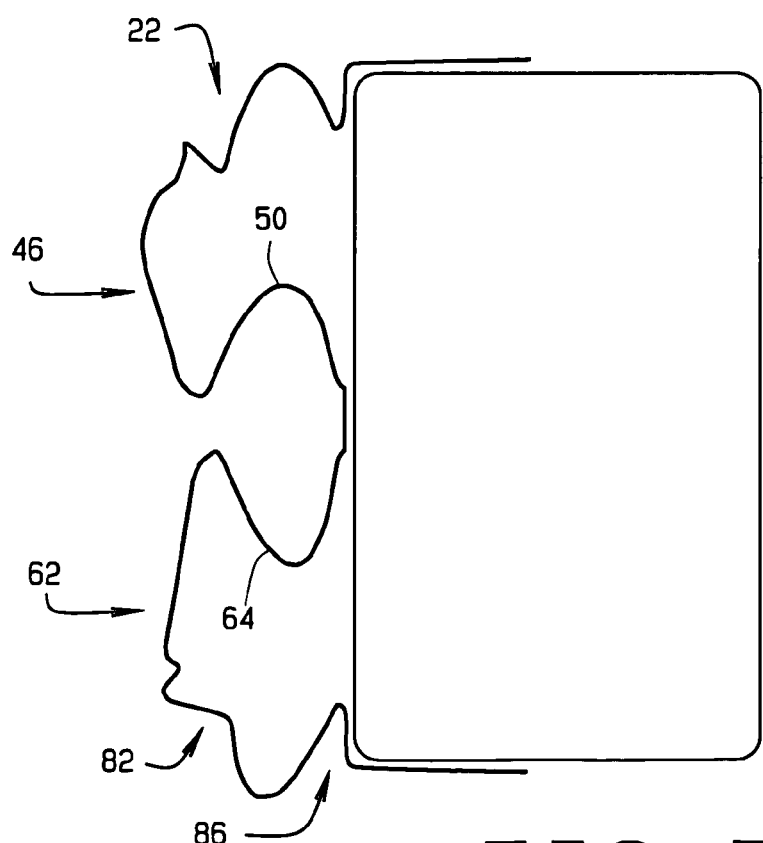
FIG. 5 is a cross-sectional schematic illustration of the energy absorber shown in FIG. 4 after an impact event.

As shown in FIG. 4, lower transverse wall 50 of upper crushable member 46 and upper transverse wall 64 of lower crushable member 62 have a concave shape or profile between a front-most portion 82 and a rearmost portion 86. The concave shape encourages the deflection of transverse walls 50 and 64 away from each other during an impact. This deflection of transverse walls 50 and 64 away from each other during impact prevents a stack-up of material which could adversely affect the ability of energy absorber 22 to absorb energy. FIG. 5 shows energy absorber 22 during an impact and the deflection of transverse walls 50 and 64.

Figure 6:
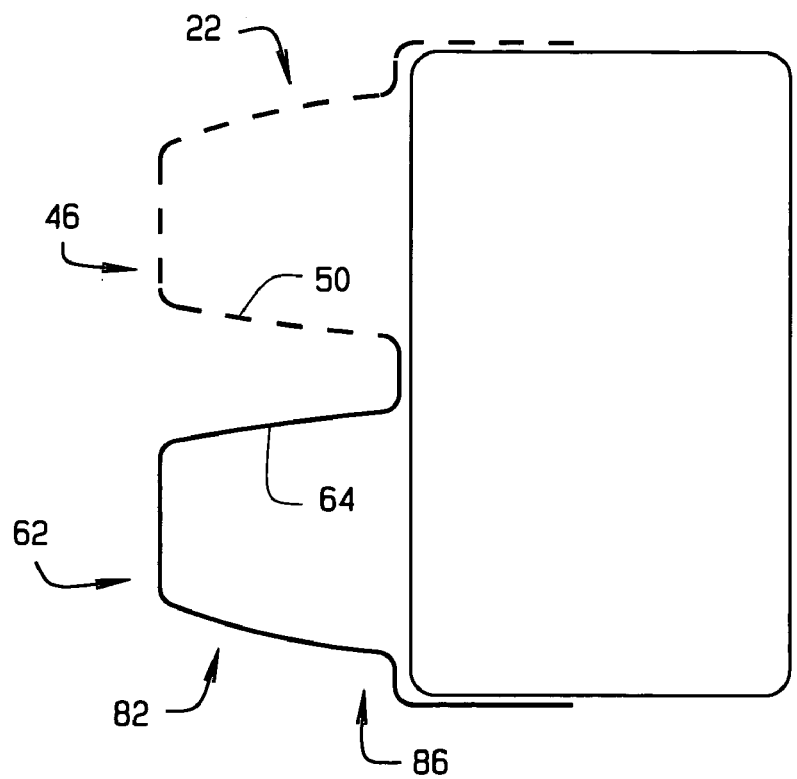
FIG. 6 is a cross-sectional schematic illustration of another embodiment of the energy absorber shown in FIG. 1.
Figure 7:
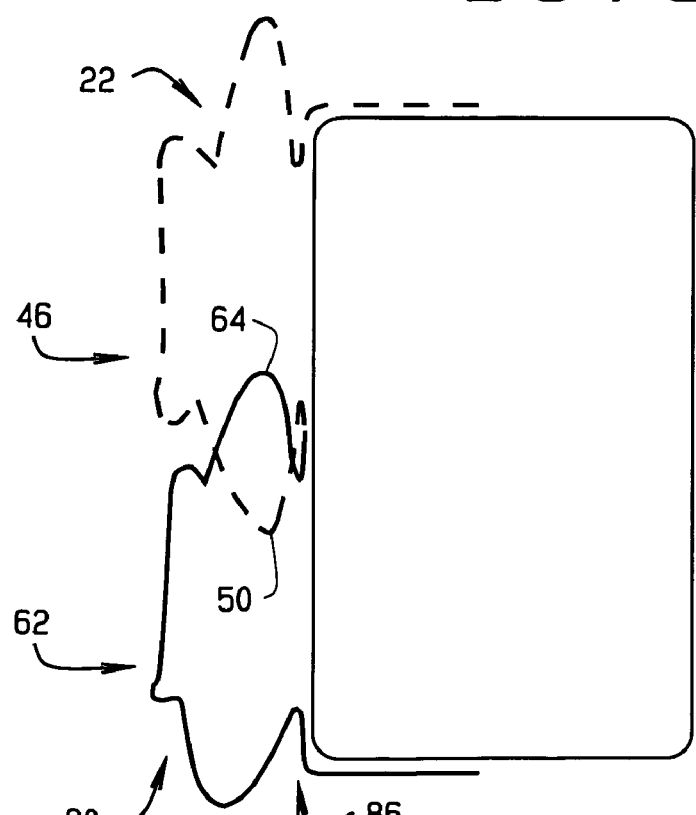
FIG. 7 is a cross-sectional schematic illustration of the energy absorber shown in FIG. 6 after an impact event.

In another embodiment, shown in FIG. 6, lower transverse wall 50 of upper crushable member 46 and upper transverse wall 64 of lower crushable member 62 have a convex shape or profile between a front-most portion 82 and a rearmost portion 86. The convex shape encourages the deflection of transverse walls 50 and 64 away from upper crushable member 46 and lower crushable member 62 respectively. This deflection of transverse walls 50 and 64 away from upper crushable member 46 and lower crushable member 62 during impact directs solid portions 58 of lower transverse wall 50 of upper crushable member to buckle into open portions 72 of upper transverse wall 64 of lower crushable member 62 and solid portions 70 of upper transverse wall 64 of lower crushable member 62 to buckle into open portions 60 of lower transverse wall 50 of upper crushable member 46 and prevents a stack-up of material which could adversely affect the ability of energy absorber 22 to absorb energy. FIG. 7 shows energy absorber 22 during an impact and the deflection of transverse walls 50 and 64.

While the invention has been described in terms of various specific embodiments, those skilled in the art will recognize that the invention can be practiced with modification within the spirit and scope of the claims.

What is claimed is:

1. A bumper system for an automobile vehicle, said bumper system comprising:
 a beam configured to attach to the vehicle; and
 an energy absorber coupled to said beam, said energy absorber comprising:
 a body having a first side and an opposing second side, said second side facing said beam,
 an upper crushable member extending from said first side of said body; and
 a lower crushable member extending from said first side of said body and spaced apart from said upper crushable member;
 said upper and lower crushable members each comprising an upper transverse wall, a lower transverse wall, and an outer wall, each said upper transverse wall and each said lower transverse wall comprising alternating solid portions and open portions, each solid and open portion extending from said body to said outer wall,
 wherein said solid portions of said lower transverse wall of said upper crushable member are aligned with said open portions of said upper transverse wall of said lower crushable member, and said solid portions of said upper transverse wall of said lower crushable member are aligned with said open portions of said lower transverse wall of said upper crushable member.

2. A bumper system in accordance with claim 1 wherein said lower transverse wall of said upper crushable member has a concave cross-sectional shape and said upper transverse wall of said lower crushable member has a concave cross-sectional shape.

3. A bumper system in accordance with claim 1 wherein said lower transverse wall of said upper crushable member has a convex cross-sectional shape and said upper transverse wall of said lower crushable member has a convex cross-sectional shape.

4. A bumper assembly in accordance with claim 1 wherein said body comprises a flanged frame for attachment to said beam.

5. A bumper system in accordance with claim 1 wherein said energy absorber comprises a thermoplastic material.

6. A bumper system in accordance with claim 5 wherein said energy absorber comprises an injection molded thermoplastic material.

7. A bumper system in accordance with claim 1 wherein said beam comprises at least one of steel, aluminum, thermoplastic, and glass mat thermoplastic.

8. A bumper assembly for an automobile vehicle, said bumper assembly comprising:
 a beam having a top surface and a bottom surface, said beam configured to attach to the vehicle;
 an energy absorber coupled to said beam; and
 a fascia attached to said energy absorber to substantially envelop said beam and said energy absorber;
 said energy absorber comprising:
 a body having a first side and an opposing second side, said second side facing said beam,
 an upper crushable member extending from said first side of said body; and
 a lower crushable member extending from said first side of said body and spaced apart from said upper crushable member;
 said upper and lower crushable members each comprising an upper transverse wall, a lower transverse wall, and an outer wall, each said upper transverse wall and each said lower transverse wall comprising alternating solid portions and open portions, each solid and open portion extending from said body to said outer wall,
 wherein said solid portions of said lower transverse wall of said upper crushable member are aligned with said open portions of said upper transverse wall of said lower crushable member, and said solid portions of said upper transverse wall of said lower crushable member are aligned with said open portions of said lower transverse wall of said upper crushable member.

9. A bumper system in accordance with claim 8 wherein said lower transverse wall of said upper crushable member has a concave cross-sectional shape and said upper transverse wall of said lower crushable member has a concave cross-sectional shape.

10. A bumper system in accordance with claim 8 wherein said lower transverse wall of said upper crushable member has a convex cross-sectional shape and said upper transverse wall of said lower crushable member has a convex cross-sectional shape.

11. A bumper assembly in accordance with claim 8 wherein said body comprises a flanged frame for attachment to said beam.

12. A bumper system in accordance with claim 8 wherein said energy absorber comprises a thermoplastic material.

13. A bumper system in accordance with claim 12 wherein said energy absorber comprises an injection molded thermoplastic material.

14. A bumper system in accordance with claim 8 wherein said beam comprises at least one of steel, aluminum, thermoplastic, and glass mat thermoplastic.

15. An energy absorber for a vehicle bumper system, said energy absorber comprising:
    a body having a first side and an opposing second side;
    an upper crushable member extending from said first side of said body; and
    a lower crushable member extending from said first side of said body and spaced apart from said upper crushable member;
    said upper and lower crushable members each comprising an upper transverse wall, a lower transverse wall, and an outer wall, each said upper transverse wall and each said lower transverse wall comprising alternating solid portions and open portions, each solid and open portion extending from said body to said outer wall,
    wherein said solid portions of said lower transverse wall of said upper crushable member are aligned with said open portions of said upper transverse wall of said lower crushable member, and said solid portions of said upper transverse wall of said lower crushable member are aligned with said open portions of said lower transverse wall of said upper crushable member.

16. A bumper system in accordance with claim 15 wherein said lower transverse wall of said upper crushable member has a concave cross-sectional shape and said upper transverse wall of said lower crushable member has a concave cross-sectional shape.

17. A bumper system in accordance with claim 15 wherein said lower transverse wall of said upper crushable member has a convex cross-sectional shape and said upper transverse wall of said lower crushable member has a convex cross-sectional shape.

18. A bumper assembly in accordance with claim 15 wherein said body comprises a flanged frame for attachment to said beam.

19. A bumper system in accordance with claim 15 wherein said energy absorber comprises a thermoplastic material.

20. A bumper system in accordance with claim 19 wherein said energy absorber comprises an injection molded thermoplastic material.

* * * * *